(12) United States Patent
Arai et al.

(10) Patent No.: US 7,216,027 B2
(45) Date of Patent: May 8, 2007

(54) RUNNING CONTROL SYSTEM

(75) Inventors: Toshiaki Arai, Utsunomiya (JP); Tadayoshi Okada, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 11/078,546

(22) Filed: Mar. 10, 2005

(65) Prior Publication Data
US 2005/0203693 A1 Sep. 15, 2005

(30) Foreign Application Priority Data
Mar. 15, 2004 (JP) ............................ P2004-072369

(51) Int. Cl.
*B60D 7/12* (2006.01)
(52) U.S. Cl. .................... 701/96; 701/70; 180/170; 340/436; 340/903
(58) Field of Classification Search ................ 701/93, 701/96, 70, 301; 180/167–171; 340/435, 340/436, 438, 903
See application file for complete search history.

(56) References Cited

U.S. PATENT DOCUMENTS 5,563,786 A * 10/1996 Torii ......................... 701/23
5,731,977 A * 3/1998 Taniguchi et al. ............ 701/96
5,913,910 A * 6/1999 Ochi et al. .................... 701/1
5,938,704 A * 8/1999 Torii ........................... 701/23
6,554,090 B1 * 4/2003 Kuroda et al. ............. 180/170
6,854,548 B2 * 2/2005 Kuroda et al. ............. 180/170

FOREIGN PATENT DOCUMENTS

JP 60-019208 1/1985

* cited by examiner

*Primary Examiner*—Y. Beaulieu
(74) *Attorney, Agent, or Firm*—O'Melveny & Myers LLP

(57) ABSTRACT

A running control system of the present invention includes a follow-up intention detection device for detecting an operation of requesting a follow-running control by the driver, and a running control device for aborting the follow-running control with respect to the preceding vehicle based on a signal from the braking operation detection device. If an operation by the driver for requesting the follow-running control is detected by the driver while the braking operation by the driver is detected by the braking operation detection device, the running control device starts the follow-running control after the end of the driver's braking operation.

4 Claims, 9 Drawing Sheets

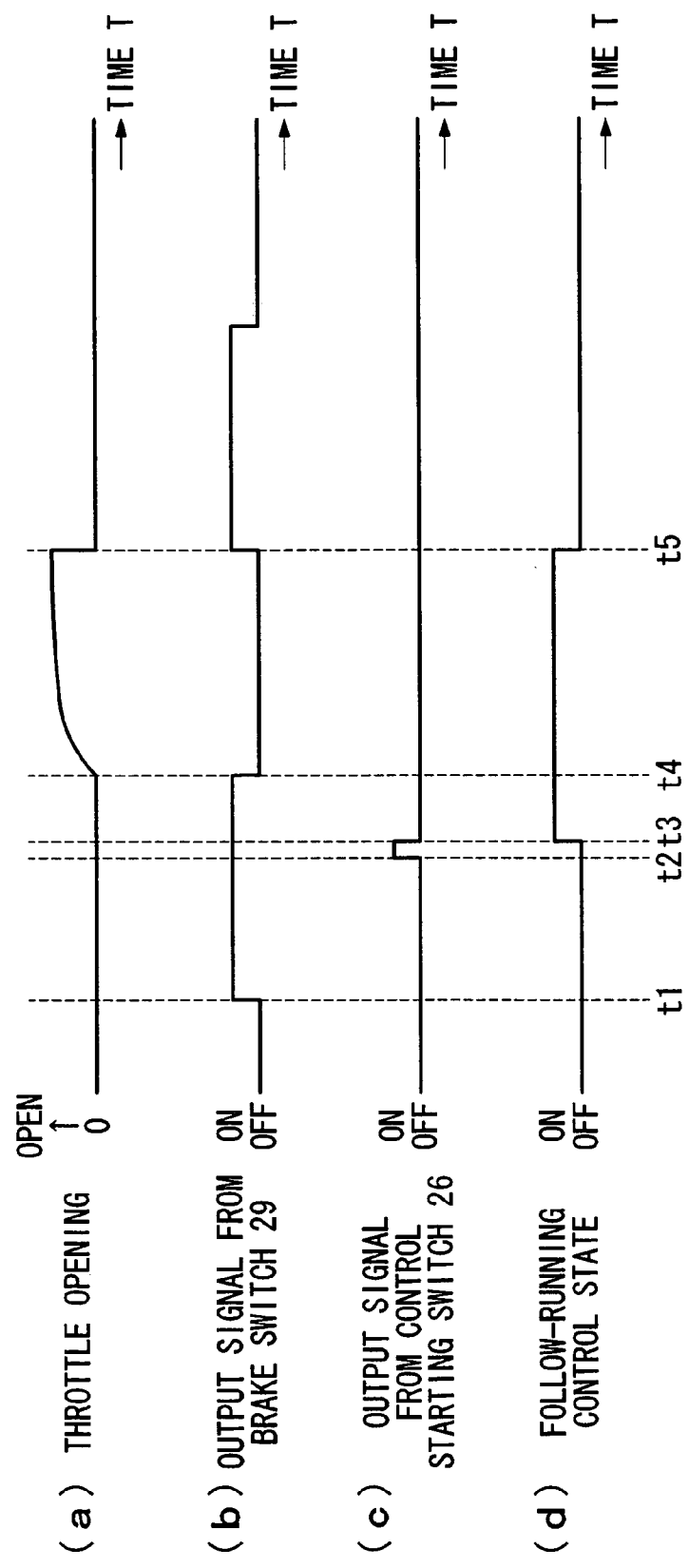

RUNNING CONTROL SYSTEM

Priority is claimed on Japanese Patent Application No. 2004-72369, filed Mar. 15, 2004, the contents of which are incorporated herein by reference.

BACKGROUND OF THE INVENTION

1. Field of the Invention

The present invention relates to a running control system for performing a follow-running control in which a preceding vehicle is determined to be a target vehicle to be followed by the vehicle following.

2. Description of Related Art

Conventionally, in order to reduce the mental stress of a driver who needs to frequently repeat operations for advancing and stopping a vehicle on a congested road so as to follow the vehicle in front (i.e., the preceding vehicle), an automatic advancing and stopping system for vehicles is provided for determining the preceding vehicle to be followed by the present vehicle and thereby performing running control of the present vehicle so that the present vehicle automatically runs following advancing and stopping of the preceding vehicle.

More specifically, the running speed of the present vehicle is controlled in consideration of the relationship between the inter-vehicle distance with respect to the preceding vehicle detected by an inter-vehicle distance detection device and the necessary inter-vehicle distance determined by a safety inter-vehicle distance detecting device. That is, the running speed of the present vehicle is decreased when the relationship is in a deceleration region, while the running speed of the present vehicle is increased when the relationship is in an acceleration region. With the running control, mental stress of the driver can be reduced since the present vehicle automatically repeats advancing and stopping following the preceding vehicle (see, for example, Japanese Unexamined Patent Application, First Publication No. S60-19208).

In conventional systems, in order to eliminate a difference in driving sensation between running by the driver's manual operation and follow-running by the running control system, or in order to obtain consistency with operation by a cruise control system (i.e., an automatic constant speed running system), if the driver performs a braking operation, running control by the running control system is aborted and then the driving control is held by the driver. Therefore, in a case in which the brake is maintained ON by keeping the brake pedal depressed so as to stop the present vehicle, an operation for starting the running control is not accepted and the running control cannot be started.

More specifically, during running on a congested road in which rapid operations for acceleration and deceleration of the present vehicle are required, braking operations are often required in order to hold the running speed of the present vehicle low. Therefore, time of operation of the brake by the driver increases. In this case, chances to start control by the running control system are limited, thereby deteriorating operability of the present vehicle.

SUMMARY OF THE INVENTION

In consideration of the above circumstances, an object of the present invention is to provide a running control system for smoothly controlling follow-running in consideration of the driver's operations performed according to changes in traffic situations around the present vehicle.

In order to achieve the above object, the present invention provides a running control system including: a vehicle speed measuring device for measuring a running speed of a present vehicle; an object detecting device, provided in the present vehicle, for detecting objects in an advance direction of the present vehicle; a preceding vehicle determining device for determining a preceding vehicle to be followed by the present vehicle from among the detected objects; a target inter-vehicle distance determining device for determining a target inter-vehicle distance between the present vehicle and the preceding vehicle; a target speed determining device for determining a target speed of the present vehicle based on a signal from the object detecting device and the target inter-vehicle distance; a follow-running control device for controlling follow-running of the present vehicle with respect to the preceding vehicle based on the determined target speed and the running speed of the present vehicle; a braking operation detection device for detecting a braking operation performed by a driver of the present vehicle; a follow-up intention detection device for detecting an operation of requesting a follow-running control by the driver; and a running control device for aborting the follow-running control with respect to the preceding vehicle based on an output signal from the braking operation detection device, wherein if an operation by the driver for requesting the follow-running control is detected while the braking operation by the driver is detected by the braking operation detection device, the running control device starts the follow-running control after the end of the driver's braking operation.

According to the running control system, if an operation for requesting the follow-running control is input by the driver while the driver's braking operation is detected, the running control device starts the follow-running control at the end of the braking operation by the driver. By the operation performed by the running control device, without leaving the follow-running control aborted due to the braking operation, in consideration of the driver's intention, the follow-running control can be restarted after the driver's braking operation only when the driver has the intention of requesting the follow-running control. Therefore, the present vehicle can appropriately run following the preceding vehicle.

Accordingly, it is possible to realize a running control system for smoothly controlling follow-running in consideration of the driver's operations performed according to changes in traffic situations around the present vehicle.

In order to achieve the above object, the present invention also provides another running control system including: a vehicle speed measuring device for measuring a running speed of a present vehicle; an object detecting device, provided in the present vehicle, for detecting objects in an advance direction of the present vehicle; a preceding vehicle determining device for determining a preceding vehicle to be followed by the present vehicle from among the detected objects; a target inter-vehicle distance determining device for determining a target inter-vehicle distance between the present vehicle and the preceding vehicle; a target speed determining device for determining a target speed of the present vehicle based on a signal from the object detecting device and the target inter-vehicle distance; a follow-running control device for controlling follow-running of the present vehicle with respect to the preceding vehicle based on the determined target speed and the running speed of the present vehicle; a braking operation detection device for detecting a braking operation performed by a driver of the present vehicle; a follow-up intention detection device for detecting an operation of requesting the follow-running control by the driver; a running control device for aborting the follow-running control with respect to the preceding vehicle based on an output signal from the braking operation detection device; and a throttle opening control device for controlling a degree of opening of a throttle of the present vehicle based on control by the running control device; wherein if the operation for requesting the follow-running control is input by the driver while the braking operation by the driver is detected by the braking operation detection device, the running control device starts the follow-running control, and the throttle opening control device maintains the degree of opening of the throttle in a fully-closed state while detecting the driver's braking operation.

According to the running control system, if an operation for requesting the follow-running control is input by the driver while braking operation by the driver is detected, the running control device starts the follow-running control and the throttle opening control device holds the degree of opening of the throttle in a fully-closed state while detecting the driver's braking operation. By the operations performed by the running control device and the throttle opening control device, without leaving the follow-running control aborted due to the braking operation, in consideration of the driver's intention, the follow-running control can be restarted after the driver's braking operation only when the driver has the intention of requesting the follow-running control. Furthermore, after the braking operation, control of the degree of opening of the throttle following the follow-running control can be started from the fully-closed state. Therefore, the present vehicle can appropriately run following the preceding vehicle.

Accordingly, as same as in previously described running control system, it is possible to realize a running control system for smoothly controlling follow-running in consideration of the driver's operations performed according to changes in traffic situations around the present vehicle.

In the running control system or the another running control system of the present invention, the braking operation detection device may output the output signal in response to the braking operation by the driver, and the running control device may terminate the follow-running control with respect to the preceding vehicle in response to a changing point in the output signal from the braking operation detecting device, which indicates a beginning of the braking operation by the driver.

In this case, if the follow-running control with respect to the preceding vehicle is terminated by the braking operation, the follow-running control is terminated based on the changing point in the signal, which indicates the beginning of the driver's braking operation. Therefore, the follow-running control which is started while maintaining the driver's braking operation can be maintained so as not to be terminated.

Accordingly, since the driver can input (i.e., set) the operation for requesting the follow-running control while operating the brake, cancellation of the braking operation is unnecessary. For example, since the possibility of undesired motion of the present vehicle due to the cancellation of the braking operation can be eliminated, the driver can obtain his or her desired motion of the present vehicle.

BRIEF DESCRIPTION OF THE DRAWINGS

FIG. 10 is a timing chart showing starting control and termination control of the running control system by the control state determining section of the running control system in the second embodiment.

DETAILED DESCRIPTION OF THE INVENTION

Hereinafter, embodiments according to the present invention will be explained with reference to the drawings.

Firstly, a first embodiment of the present invention will be explained. In the first embodiment, if a driver performs an operation for requesting starting of follow-running control during a braking operation, the present vehicle appropriately advances so as to follow a preceding vehicle by starting the follow-running control after termination of the braking operation.

System Structure

Figure 1:
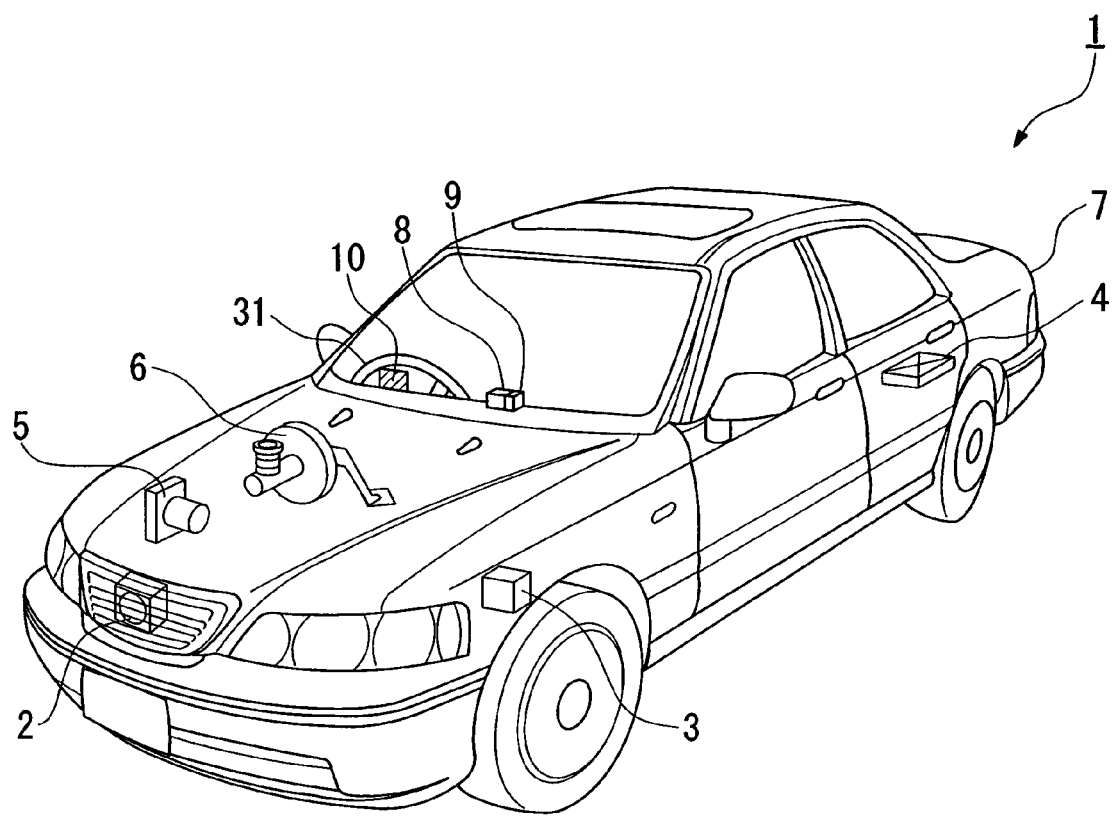
FIG. 1 is a perspective view showing a vehicle in which a first embodiment of a running control system of the present invention is provided.
Figure 2:
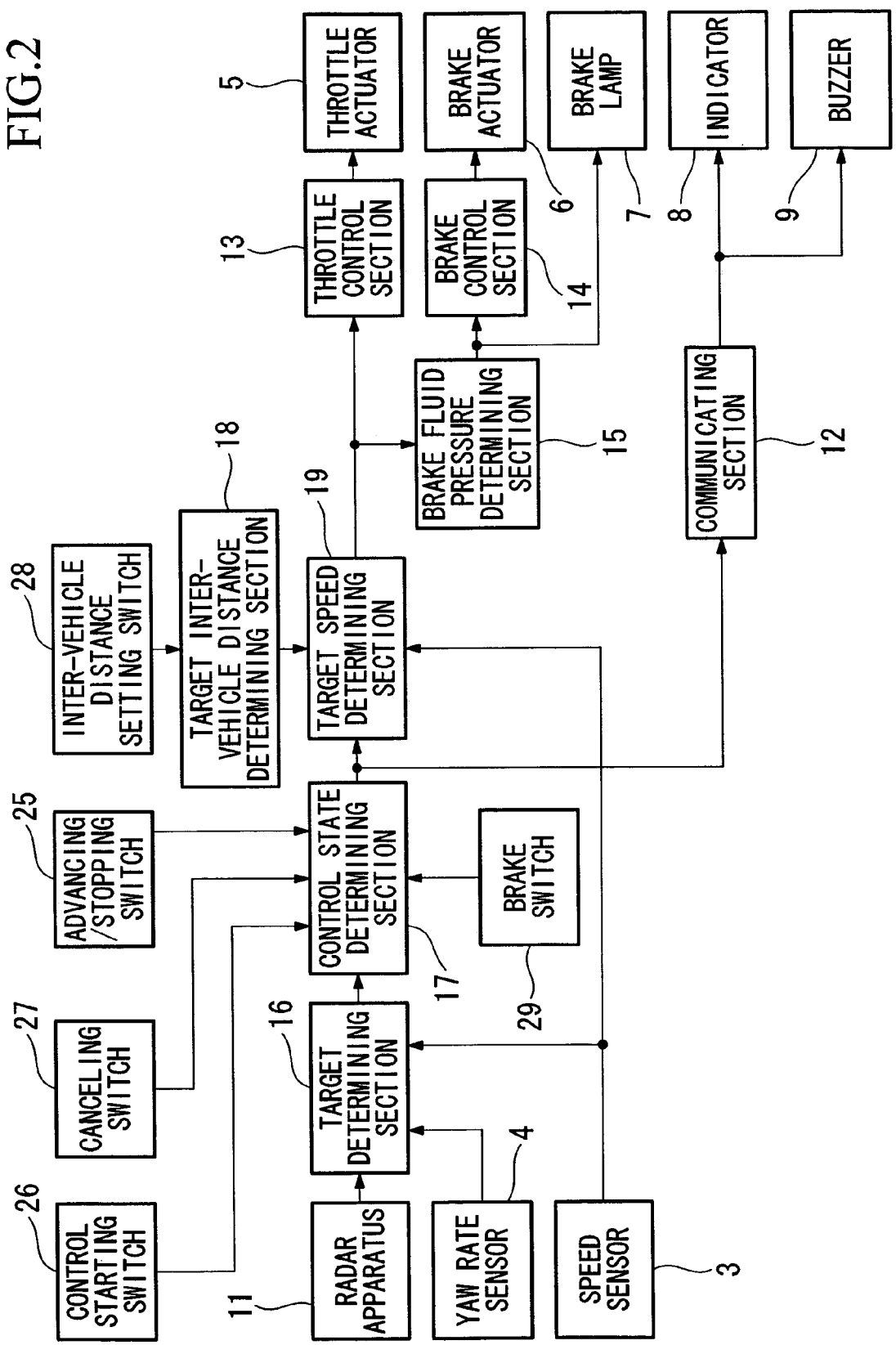
FIG. 2 is a block diagram for showing the structure of the running control system.

FIG. 1 is a perspective view showing a vehicle 1 in which the first embodiment of the running control system of the present invention is provided. FIG. 2 is a block diagram showing the structure of the running control system in the first embodiment.

In FIG. 1, the running control system of the present embodiment is generally constructed as a millimeter-wave radar integrated ECU (electronic control section) 2. The vehicle 1 has a speed sensor 3 for measuring the running speed of the vehicle 1, and a yaw rate sensor 4 for measuring the yaw rate of the vehicle 1. The measured speed and yaw rate are input into the millimeter-wave radar integrated ECU 2 (i.e., the running control system).

The vehicle 1 also includes a throttle actuator 5 for operating a throttle for an engine of the vehicle 1 using oil pressure or electricity, and a brake actuator 6 for operating a brake of the vehicle 1, also using oil pressure or electricity.

At the rear side of the vehicle 1, a brake lamp 7 for indicating the operation state of the brake of the vehicle 1 is provided.

Near the driver's seat of the vehicle 1, an indicator 8 and a buzzer 9 are provided for informing the driver of the control state of the running control system. Near a steering wheel 31, switches 10, operated by the driver, are provided for inputting the driving operation for the running control system.

The structure of the millimeter-wave radar integrated ECU 2 (i.e., the running control system) will be explained in detail by referring to FIG. 2. Reference numeral 11 indicates a radar apparatus for sending a radar wave to the surroundings of the vehicle 1 and receiving waves reflected by objects. This radar apparatus 11 is provided at the front side of the vehicle 1 and detects an object in front of the vehicle 1 by using the received reflected waves.

The running control system of the present embodiment has a processing section realized in the ECU section of the millimeter-wave radar integrated ECU 2, which includes a CPU (central processing section). Specifically, the processing section includes a communicating section 12, a throttle control section 13, a brake control section 14, a brake fluid pressure determining section 15, a target determining section 16, a control state determining section 17, a target inter-vehicle distance determining section 18, and a target speed determining section 19.

The communicating section 12 informs the driver of the control state of the running control system, by using the indicator 8 or the buzzer 9 provided near the driver's seat.

The throttle control section 13 determines the degree of opening of the throttle and controls the throttle actuator 5 for operating the throttle for the engine of the vehicle 1.

The brake control section 14 controls the brake actuator 6 for operating the brake of the vehicle 1. The control of the brake actuator 6 by the brake control section 14 is performed based on a target fluid pressure (i.e., a target hydraulic pressure) of the brake fluid, which is determined by the brake fluid pressure determining section 15. In addition, the on/off state of the brake lamp 7, provided at the rear side of the vehicle 1, is also controlled according to the target fluid pressure of the brake fluid determined by the brake fluid pressure determining section 15.

The target determining section 16 processes data of an object in front of the vehicle 1, which is detected by the radar apparatus 11. The target determining section 16 has a running locus computing unit for computing the running locus of the vehicle 1 (i.e., the running locus of the present vehicle) by referring to the speed and the yaw rate of the vehicle 1 measured by the speed sensor 3 and the yaw rate sensor 4. The target determining section 16 also has a preceding vehicle determining unit for (i) detecting a preceding vehicle followed by the present vehicle 1 according to the computed running locus of the present vehicle and the data of objects in front of the vehicle 1 output from the radar apparatus 11, and (ii) computing object data which include the distance between the detected preceding vehicle and the vehicle 1 and the relative speed between the preceding and present vehicles.

For example, the target determining section 16 recognizes a vehicle on an extrapolation from the running locus of the present vehicle as the preceding vehicle by dividing the speed of the vehicle 1 by the yaw rate of the vehicle 1 so as to compute the corner R (i.e., the radius of curvature at each corner) of the road on which the vehicle 1 is running and determine the running locus of the present vehicle. The target determining section 16 also recognizes stationary objects provided along the sides of the traffic lane, such as cat's-eyes or a white stripes, so as to determine the lane on which the vehicle 1 is running, thereby distinguishing the preceding vehicle on the lane on which the vehicle 1 is running from vehicles in the next lane. In addition, if the vehicle 1 is stopped, the target determining section 16 distinguishes the preceding vehicle from the other vehicles by referring to the running locus of the present vehicle 1 computed before the stopping of the present vehicle 1.

The control state determining section 17 performs running control of the vehicle 1 based on (i) the output signal from a switch among the switches 10 provided for the driver who inputs the driving operation, where the switches 10 include a advancing/stopping switch 25 for the driver who inputs the intention of the advancing or stopping operation, a control starting switch 26 for inputting the intention of starting the follow-running control, and a canceling switch 27 for inputting the intention of canceling the follow-running control, (ii) the output signal from a brake switch 29 which is provided in a brake pedal for indicating an operation state of the brake pedal which is operated by the driver, and (iii) data of the object input from the target determining section 16. The control state determining section 17 informs the driver of the control state of the running control system via the communicating section 12. The running control of the vehicle 1 is performed based on the transition between the three states of OFF, FOLLOW-UP, and HOLD STOP STATE. The state transition in the running control of the vehicle 1 by the control state determining section 17 will be explained below in detail.

The target inter-vehicle distance determining section 18 determines a target distance between the vehicle 1 controlled by the running control system and the preceding vehicle (i.e., the target inter-vehicle distance), based on the driver's operation input via an inter-vehicle distance setting switch 28 among the switches 10 (provided for the driver who inputs the driving operation). The target speed determining section 19 computes a target speed which is an optimum speed for the vehicle 1 based on the control state determined by the control state determining section 17 and the target inter-vehicle distance determined by the target inter-vehicle distance determining section 18. In order that the vehicle 1 runs at the target speed, the target speed determining section 19 controls the throttle control section 13 and the brake fluid pressure determining section 15.

Specifically, when the target speed is higher than the present speed of the vehicle 1, the target speed determining section 19 commands the throttle actuator 5 to increase the degree of opening of the throttle, which is output from the throttle control section 13, so as to increase the engine speed and accelerate vehicle 1. When the target speed is lower than the present speed of the vehicle 1, the target speed determining section 19 commands the brake actuator 6 to increase the target fluid pressure of the brake fluid, which is output from the brake fluid pressure determining section 15, so as to make the brake control section 14 operate the brake.

Figure 3:
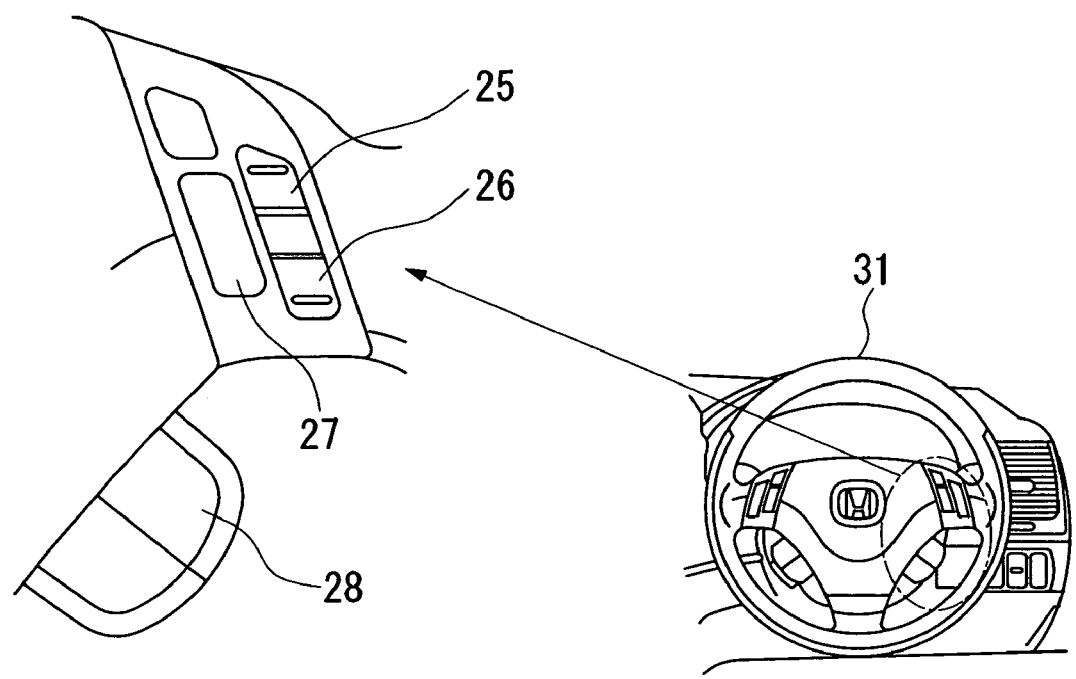
FIG. 3 shows an example of the layout for an advancing/stopping switch, a control starting switch, a canceling switch, and an inter-vehicle distance setting switch of the running control system.

FIG. 3 shows an example of the layout for the above-explained advancing/stopping switch 25, the control starting switch 26, the canceling switch 27, and the inter-vehicle distance setting switch 28. Each switch is provided close to the steering wheel 31 for the driver's smooth operation. Here, operation switches of the cruise control provided in the vehicle 1 may also serve as the advancing/stopping switch 25, the control starting switch 26, the canceling switch 27, and the inter-vehicle distance setting switch 28.

Control State Transition

Hereinbelow, the state of transition of the running control by the control state determining section 17 will be explained by referring to the drawings.

Figure 4:
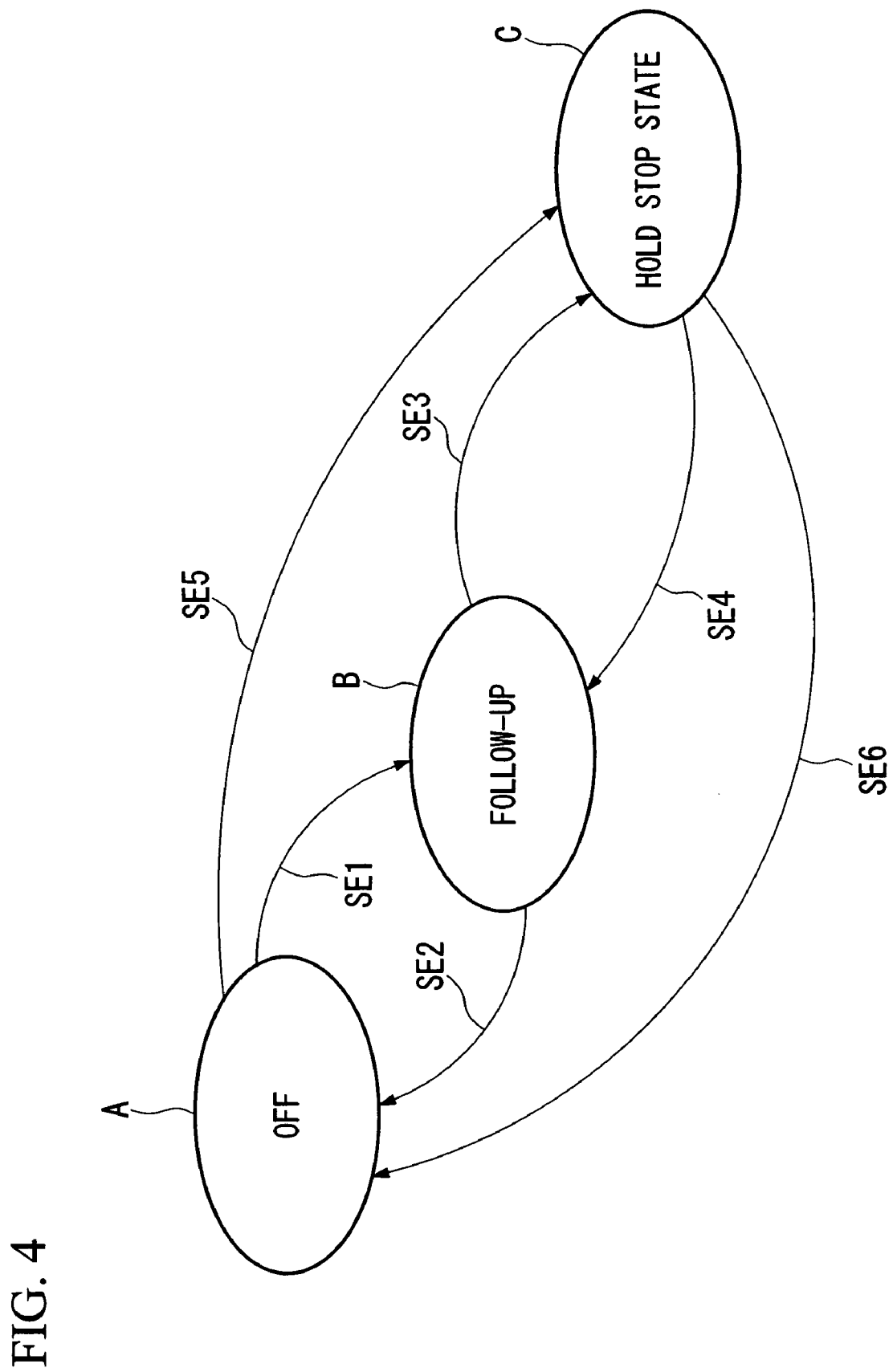
FIG. 4 is a diagram showing the state transition of the running control by the control state determining section of the running control system.

FIG. 4 is a diagram showing the state transition of the running control by the control state determining section 17.

FIG. 4 shows three states A: OFF, B: FOLLOW-UP, and C: HOLD STOP STATE, as explained above. The first state OFF indicates a state when running control by the running control system is not being performed. The second state FOLLOW-UP indicates a state when the running control by the running control system is being performed. The third state HOLD STOP STATE indicates a state in which after the preceding vehicle followed by the vehicle 1 is stopped, the vehicle 1 stops behind the preceding vehicle and holds the stopped state.

The control state determining section 17 changes the running control state as shown in FIG. 4, according to the input as explained below, which functions as a trigger.

When the present running control state is OFF (see reference symbol A in FIG. 4), if the preceding vehicle followed by the vehicle 1 is detected and the driver switches on the control starting switch 26, the control state determining section 17 changes the running control state from OFF to FOLLOW-UP (see reference symbols B and SE1 (which indicates a state transition) in FIG. 4).

When the present running control state is FOLLOW-UP, if the vehicle 1 loses the trail of the preceding vehicle, or the driver switches on the canceling switch 27 or depresses the brake pedal, the control state determining section 17 changes the running control state from FOLLOW-UP to OFF (see reference symbol SE2 (which also indicates a state transition)).

When the present running control state is FOLLOW-UP, if the preceding vehicle is stopped and the vehicle 1 stops behind the preceding vehicle at a predetermined position, the control state determining section 17 changes the running control state from FOLLOW-UP to HOLD STOP STATE (see reference symbols C and SE3 (which also indicates a state transition)).

When the present running control state is in the HOLD STOP STATE, if the driver switches on the advancing/stopping switch 25 or depresses the accelerator pedal, the control state determining section 17 changes the running control state from HOLD STOP STATE to FOLLOW-UP (see reference symbol SE4 (which also indicates a state transition)).

When the present running control state is OFF and the preceding vehicle followed by the vehicle 1 is stopped and the vehicle 1 is also stopped behind the preceding vehicle, if the driver switches on the control starting switch 26, the control state determining section 17 directly changes the running control state from OFF to HOLD STOP STATE (see reference symbol SE5 (which also indicates a state transition)).

When the present running control state is in the HOLD STOP STATE, if the driver switches on the canceling switch 27 or depresses the brake pedal, the control state determining section 17 directly changes the running control state from HOLD STOP STATE to OFF (see reference symbol SE6 (which also indicates a state transition)).

Details of changing the state transition between OFF, and FOLLOW-UP or HOLD STOP STATE will be explained below.

Starting Control and Termination Control in the Follow-Running Control

The state transition between the abovementioned OFF, and FOLLOW-UP or HOLD STOP STATE by the control state determining section 17 (i.e., starting control and termination control in the follow-running control) will be explained below by referring to the drawings.

Figure 5:
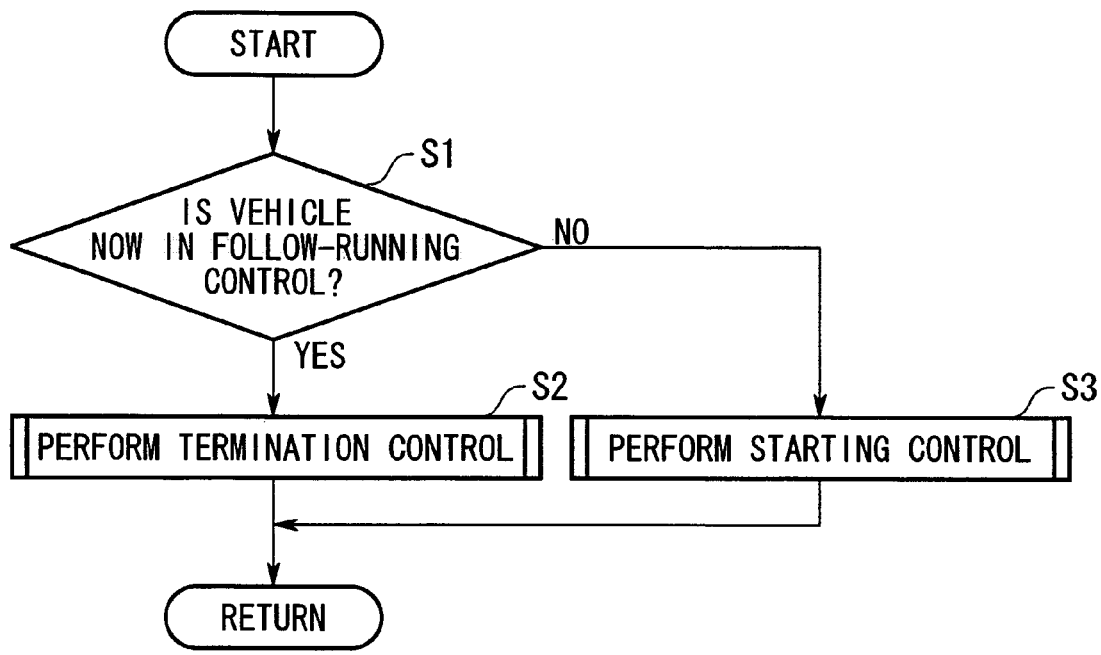
FIG. 5 is a flowchart showing a confirmation process for starting control and termination control of the follow-running control by the control state determining section of the running control system in the first embodiment.

Firstly, confirmation process for starting control and termination control of the running control system will be explained with reference to a flowchart shown in FIG. 5. FIG. 5 is a flowchart showing a confirmation process for the starting control and the termination control of the follow-running control by the control state determining section 17 of the running control system according to the present embodiment. The control state determining section 17 periodically starts and executes the processes shown in FIG. 5.

In FIG. 5, the control state determining section 17 is periodically activated and then judges whether the present vehicle is now in the follow-running control with respect to a preceding vehicle (in step S1).

In step S1, if the present vehicle is now in the follow-running control (when determined YES in step S1), the termination control of the follow-running control (to be explained later) is executed (in step S2).

In step S1, if the present vehicle is now not in the follow-running control (when determined NO in step S1), starting control of the follow-running control (to be explained later) is executed (in step S3).

Termination Control

Figure 6:
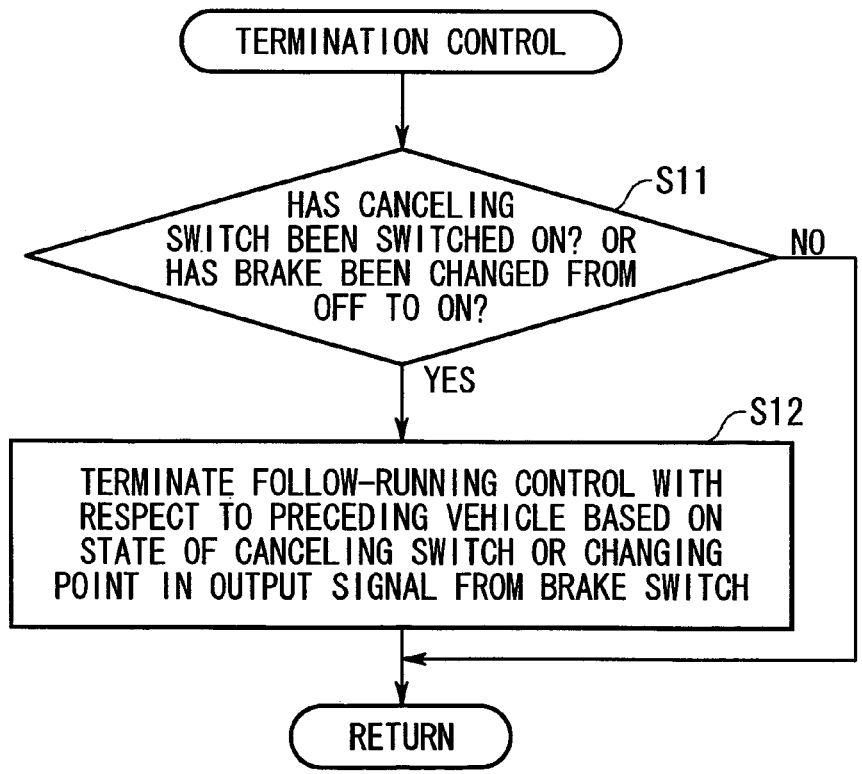
FIG. 6 is a flowchart showing termination control of the follow-running control by the control state determining section of the running control system.

The above-mentioned termination control of the follow-running control will be explained below with reference to a flowchart shown in FIG. 6. FIG. 6 is a flowchart showing the termination control of the follow-running control by the control state determining section 17 of the running control system in the present embodiment.

In FIG. 6, the control state determining section 17 judges whether the canceling switch 27 is switched on or not, or whether the brake is changed from OFF (i.e., inactive state) to ON (i.e., active state) based on an output signal from the brake switch 29 (in step S11).

In step S11, if the canceling switch 27 is switched on or the brake is changed from OFF to ON (when determined YES in step S11), the control state determining section 17 terminates the follow-running control with respect to the preceding vehicle based on the state of an output signal from the canceling switch 27 or a rising point (i.e. a changing point) of an output signal from the brake switch 29 (n step S12), and then terminates the termination control of the follow-running control.

In step S11, if the canceling switch 27 is not switched on, or the brake is held in OFF and the brake is not changed from OFF to ON, the control state determining section 17 terminates the termination control of the follow-running control without performing anything (when determined NO in step S11).

Accordingly, when the running control state is FOLLOW-UP or HOLD STOP STATE, if braking operation by the driver is detected, then the follow-running control is terminated at the time when the rising point (the changing point) of the output signal from the brake switch 29 which indicates beginning of the braking operation is detected, and the control state determining section 17 shifts the running control state to OFF.

Starting Control

Figure 7:
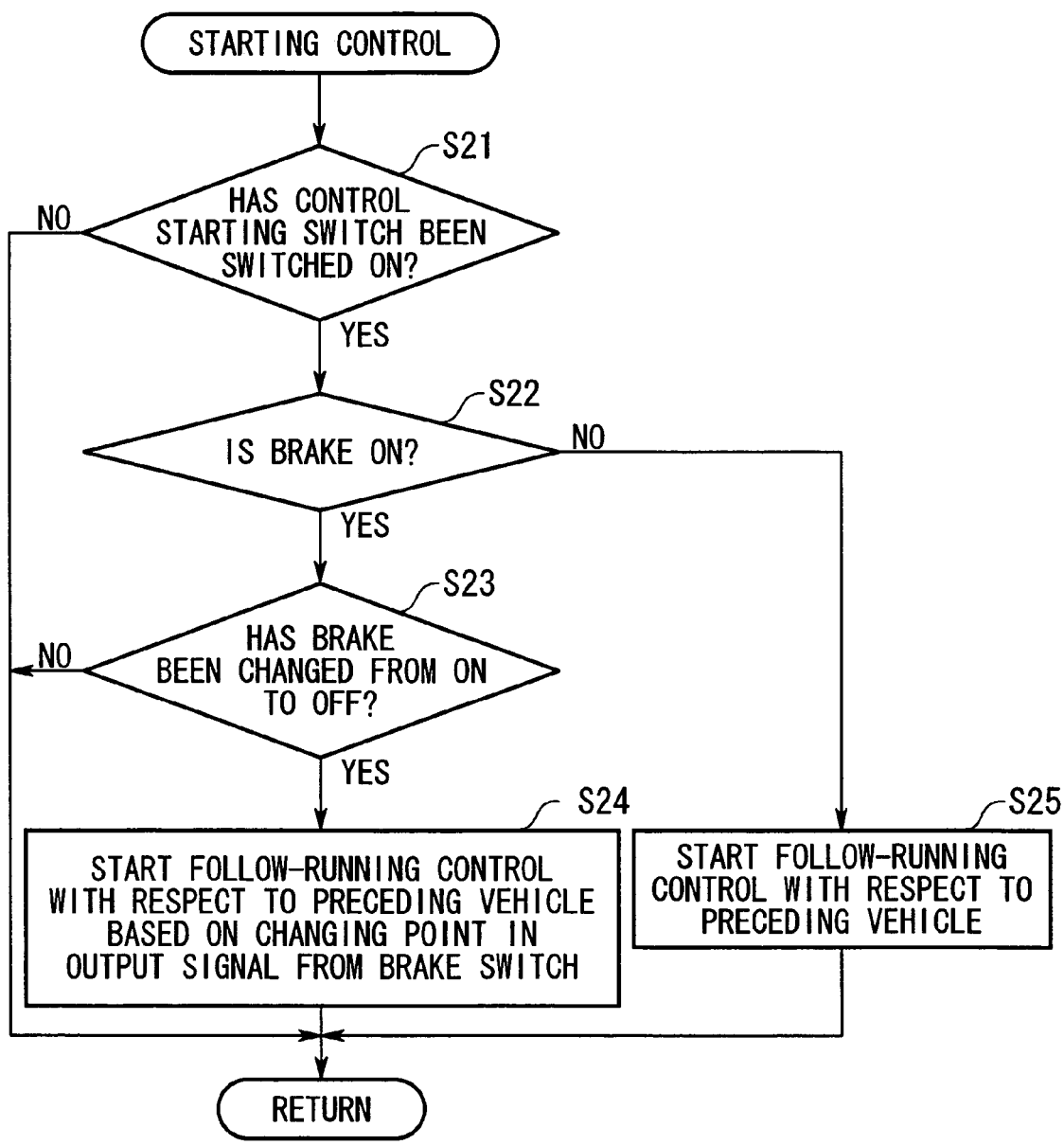
FIG. 7 is a flowchart showing starting control of the follow-running control by the control state determining section of the running control system.

The above-mentioned starting control of the follow-running control will be explained below with reference to a flowchart shown in FIG. 7. FIG. 7 is a flowchart showing the starting control of the follow-running control by the control state determining section 17 of the running control system in the present embodiment.

In FIG. 7, the control state determining section 17 judges whether the control starting switch 26 is switched on (in step S21).

In step S21, if the control starting switch 26 is switched on (when determined YES in step S21), the control state determining section 17 judges whether the brake is ON (active state) based on an output signal from the brake switch 29 (in step S22).

In step S22, if the brake is ON (i.e., active state) (when determined YES in step S22), the control state determining section 17 judges whether the brake is changed from ON to OFF (i.e., inactive state) (in step S23).

In step S23, if it is determined that the brake is changed from ON to OFF (when determined YES in step S23), the control state determining section 17 starts the follow-running control with respect to the preceding vehicle based on a falling point (i.e. a changing point) of an output signal from the brake switch 29 (in step S24), and then terminates the starting control of the follow-running control.

In step S22, if the brake is not ON (when determined NO in step S22), the control state determining section 17 absolutely starts the follow-running control with respect to the preceding vehicle (in step S25), and then terminates the starting control of the follow-running control.

If the control starting switch 26 is OFF in step S21 (when determined NO in step S21), or the brake is held in ON and is not changed from ON to OFF in step S23 (when determined NO in step S23), the control state determining section 17 terminates the starting control of the follow-running control without performing anything.

Accordingly, when the running control state is OFF, if the control starting switch 26 is switched on and an operation for requesting the follow-running control is input by the driver while detecting the driver's braking operation, then the follow-running control with respect to the preceding vehicle is started at the time when the falling point (i.e., changing point) of the output signal from the brake switch 29 which indicates beginning of the braking operation is detected, and the control state determining section 17 shifts the running control state to FOLLOW-UP or HOLD STOP STATE.

Figure 8:
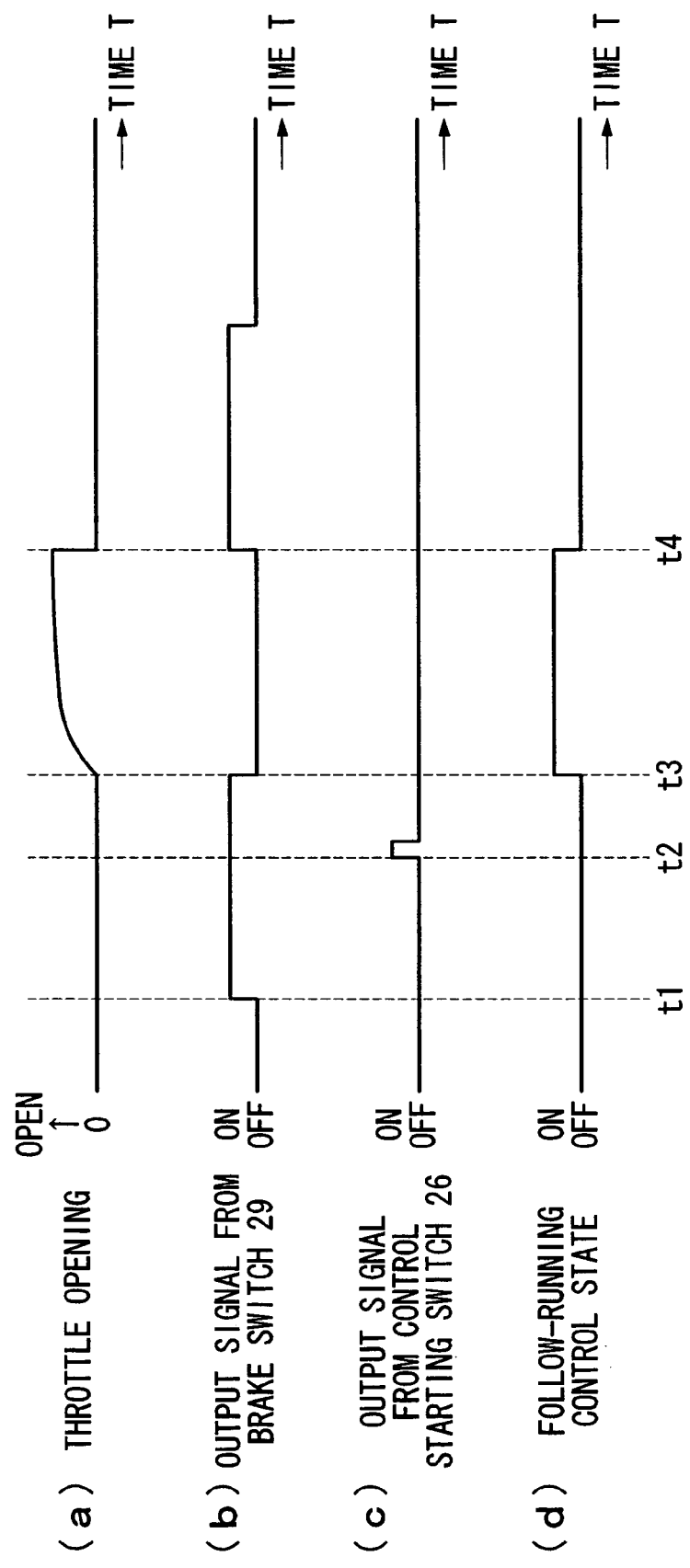
FIG. 8 is a timing chart showing starting control and termination control of the follow-running control by the control state determining section of the running control system.

More specifically, the above-mentioned starting control and termination control of the follow-running control will be explained below by referring to FIG. 8. FIG. 8 is a timing chart for showing the starting control and the termination control of the follow-running control of the present embodiment.

When braking operation by the driver is maintained in ON as shown in an output signal from the brake switch 29 after time t1 (see reference symbol (b) in FIG. 8), if the driver switched on the control starting switch 26 and an output signal therefrom is turned ON as shown in an output signal from the control starting switch 26 after the time t2 (see reference symbol (c) in FIG. 8), then the control state determining section 17 detects the changing point in the output signal from the brake switch 29 at the time when the braking operation is ended (see reference symbol (b) in FIG. 8), and the control state determining section 17 starts the follow-running control as shown in the follow-running control state (see reference symbol (d) in FIG. 8). After the above-mentioned processes, the degree of opening of the throttle is increased by the follow-running control (see reference symbol (a) in FIG. 8). Then, if the braking operation by the driver is detected again as shown in the output signal from the brake switch 29 at time t4 (see reference symbol (b) in FIG. 8), the follow-running control is terminated as shown in the follow-running control state (see reference symbol (d) in FIG. 8) by detecting a changing point in the output signal from the brake switch 29 (see reference symbol (b) in FIG. 8).

As explained above, the running control system of the present embodiment has the radar apparatus 11 which can detect objects in the advance direction of the vehicle 1, determines the preceding vehicle 41 to be followed by the vehicle 1 among the detected objects, and performs the follow-running control with respect to the determined preceding vehicle 41. In the running control system, the control state determining section 17 is periodically activated and monitors whether the control starting switch 26 is switched on.

If the control starting switch 26 is switched on, the control state determining section 17 determines whether the brake is ON, based on the output signal from the brake switch 29. If the brake is ON, then the control state determining section 17 monitors whether the brake is changed from ON to OFF. If the brake is changed from ON to OFF, the control state determining section 17 starts the follow-running control based on a falling point (i.e., a changing point) in the output signal form the brake switch 29. Thus, the vehicle 1 can appropriately advance such that the vehicle 1 follows the preceding vehicle 41.

On the other hand, when the brake is changed from OFF to ON, the control state determining section 17 terminates the follow-running control if a rising point (i.e., a changing point) in the output signal form the brake switch 29 is detected.

Therefore, only when the driver's intention for requesting the follow-running control is confirmed by detecting that the control starting switch 26 is switched on, the control state determining section 17 starts the follow-running control after the braking operation by the driver. Thus, the vehicle 1 can advance such that the vehicle 1 appropriately follows the preceding vehicle 41. When the driver terminates the follow-running control with respect to the preceding vehicle by operating the brake, the control state determining section 17 terminates the follow-running control based on the changing point in the output signal form the brake switch 29 (which detects the braking operation). Therefore, the follow-running control which is started while maintaining the driver's braking operation can be maintained so as not to be terminated.

Accordingly, since the driver can input (i.e., set) an operation for requesting the follow-running control by switching on the control starting switch 26, while operating the brake, cancellation of the braking operation at the same time is unnecessary. For example, since the possibility of undesired motion of the present vehicle by canceling the braking operation can be eliminated, the driver can obtain his or her desired motion of the present vehicle. In addition, an operation by the driver for requesting the follow-running control which is detected during the braking operation is held, and then is performed after the end of the braking operation so that the vehicle 1 restarts running based on the follow-running control. Therefore, it is possible to realize a follow-running control system for smoothly controlling the follow-running in consideration of the driver's operation performed according to changes in traffic situations around the present vehicle.

A second embodiment of the present invention will be explained below. In the present embodiment, if an operation for requesting starting of the follow-running control is performed while operating the brake, then the follow-running control is immediately started. However, the degree of opening of the throttle is held in a fully-closed state while detecting the driver's braking operation. In addition, controlling the degree of opening of the throttle in response to the follow-running control is started after the end of the braking operation so that the present vehicle can run appropriately following the preceding vehicle.

System Structure and Control State Transition

The system structure of the present embodiment is the same as the system structure of the first embodiment, and explanation thereof is omitted here. In addition, all of (i) the state transitions of running control by the control state determining section 17, (ii) confirmations of starting and termination of the follow-running control, and (iii) termination control from HOLD STOP STATE or FOLLOW-UP, to OFF, are also same as in the first embodiment, and explanation thereof is omitted here. Switching control of the follow-running control from OFF to FOLLOW-UP or HOLD STOP STATE by the control state determining section 17 will be explained below.

Starting Control of the Follow-Running Control

Figure 9:
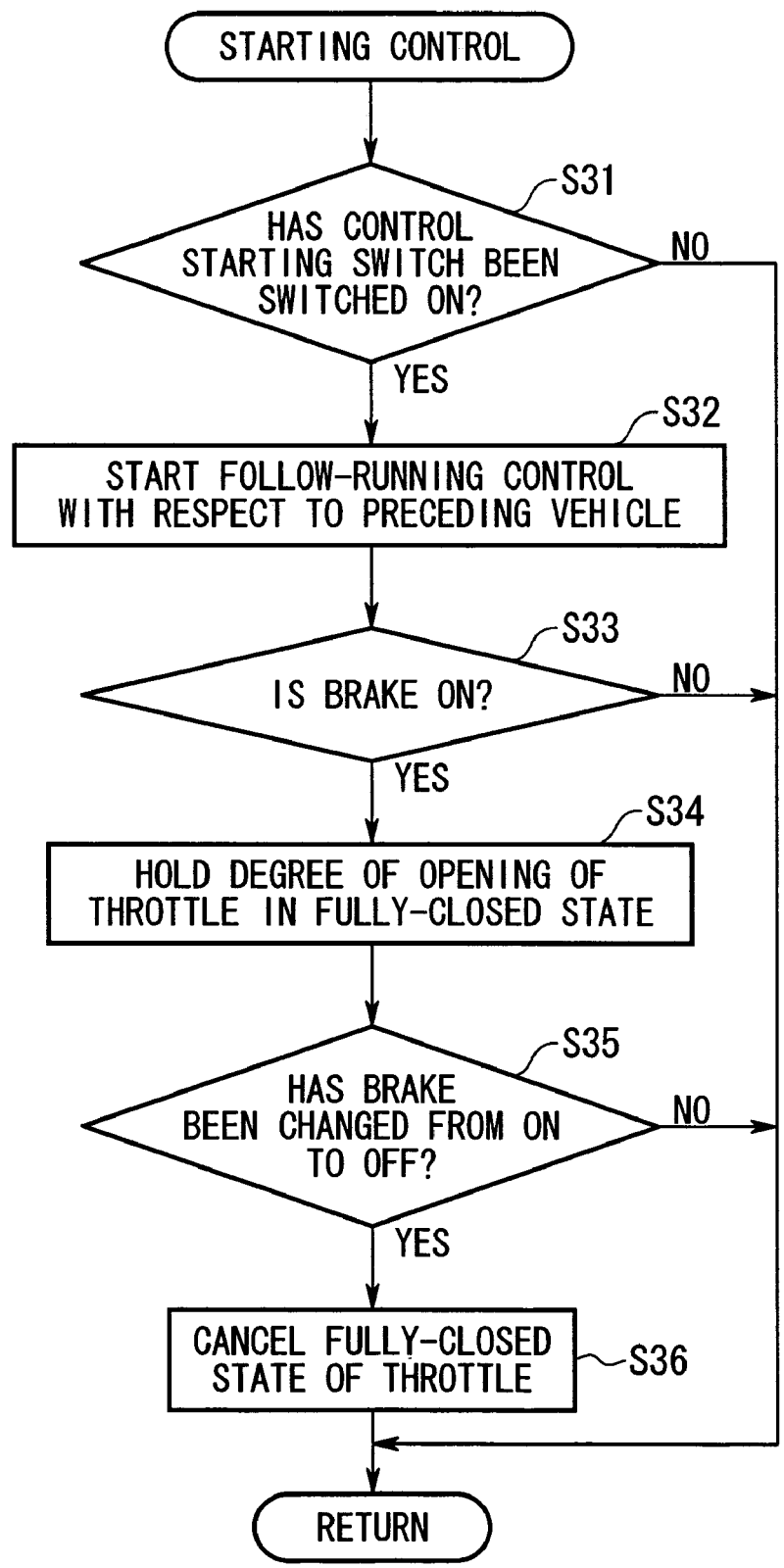
FIG. 9 is a flowchart showing starting control of the follow-running control by a control state determining section of a running control system in a second embodiment.

FIG. 9 is a flowchart showing a starting control of a follow-running control by a control state determining section 17 of the running control system according to the present embodiment. Processes in the flowchart shown in FIG. 9 are executed as the starting control of the follow-running control explained in the first embodiment with reference to FIG. 5.

In step S31, the control state determining section 17 determines whether the control starting switch 26 is switched on.

If the control starting switch 26 is switched on in step S31 (when determined YES in step S31), the control state determining section 17 starts the follow-running control with respect to the preceding vehicle (in step S32).

In step S33, the control state determining section 17 determines whether the brake is ON (i.e., active state) based on an output signal from the brake switch 29.

In step S33, if the brake is ON (when determined YES in step S33), the control state determining section 17 commands the throttle control section 13 via the target speed determining section 19, so as to hold the degree of opening of the throttle in a fully-closed state (in step S34).

The control state determining section 17 further determines whether the brake is changed from ON to OFF (i.e., inactive state) (in step S35).

If it is determined that the brake is changed from ON to OFF in step S35 by detecting a falling point (i.e., a changing point) in an output signal from the brake switch 29, then the control state determining section 17 cancels the command for holding the degree of opening of the throttle in the fully-closed state, which is sent to the throttle control section 13 via the target speed determining section 19 (in step S36). At this time, control of the degree of opening of the throttle is started following the follow-running control, and the vehicle 1 runs appropriately following the preceding vehicle.

On the other hand, if the control starting switch 26 is not switched on in step S31 (when determined NO in step S31), the control state determining section 17 terminates the starting control of the follow-running control without performing anything.

If it is determined that the brake is not ON in step S33 (when determined NO in step S33), the control state determining section 17 (which had started the follow-running control with respect to the preceding vehicle) terminates the starting control of the follow-running control while maintaining the follow-running control.

When the brake is ON, if it is determined that the brake is not changed from ON to OFF in step S35 (when determined NO in step S35), the control state determining section 17 terminates the starting control of the follow-running control while maintaining the fully-closed state of the degree of opening of the throttle.

As explained above, when the running control state is OFF, if the control starting switch 26 is switched on and an operation for requesting the follow-running control is input by the driver while the braking operation by the driver is detected, then the control state determining section 17 starts the follow-running control with respect to the preceding vehicle and changes the running control state from FOLLOW-UP to HOLD STOP STATE. At this time, the control state determining section 17 commands the throttle control section 13 via the target speed determining section 19, so as to hold the degree of opening of the throttle in the fully-closed state until the falling point (i.e., the changing point indicating the end of the braking operation) of the output signal from the brake switch 29 is detected.

Details of the above-mentioned starting control of the follow-running control, and the termination control explained in the first embodiment will be explained below with reference to a timing chart shown in FIG. 10. FIG. 10 is a timing chart showing the starting control and the termination control of the running control system according to the present embodiment. When the braking operation is maintained from time t1 as indicated in the output signal from the brake switch 29 (see reference symbol (b) in FIG. 10), if the driver switched on the control starting switch 26 and an output signal from the control starting switch 26 is turned ON at time t2 as shown in the output signal from the control starting switch 26 (see reference symbol (c) in FIG. 10), then the control state determining section 17 starts the follow-running control at time t3 (i.e., at the time the output signal from the control switch 26 is retuned to OFF as shown in (d): the follow-running control state in FIG. 10). However, the control state determining section 17 holds the degree of opening of the throttle in a fully-closed state as shown in (a) of FIG. 10 while the driver's braking operation is detected by an output signal from the brake switch 29 as shown in (b) in FIG. 10.

When the driver terminates the braking operation at time t4, the control state determining section 17 detects the changing point in the output signal from the brake switch 29 as shown in (b) in FIG. 10, and then starts controlling the degree of opening of the throttle following the follow-running control. By performing these processes, the degree of opening of the throttle increases following the follow-running control. When the driver starts the braking operation again at time t5 as indicated in (b): output signal from the brake switch 29 in FIG. 10, the control state determining section 17 detects the changing point in the output signal from the brake switch 29 which is shown in (b): output signal from the brake switch 29 in FIG. 10, and then terminates the follow-running control as shown in (d): the follow-running control state.

Moreover, processes in steps S34 and S36 performed by the control state determining section 17 in the present embodiment correspond to a throttle opening control device of the present invention.

As explained above, the running control system of the present embodiment has the radar apparatus 11 which can detect objects in the advance direction of the vehicle 1, determines the preceding vehicle 41 to be followed by the vehicle 1 among the detected objects, and performs the follow-running control with respect to the determined preceding vehicle. In the running control system, the control state determining section 17 is periodically activated and monitors whether the control starting switch 26 is switched on.

If the control starting switch 26 is switched on, the control state determining section 17 immediately starts the follow-running control, and determines whether the brake is ON based on the output signal from the brake switch 29.

If the brake is ON, then the control state determining section 17 holds the degree of opening of the throttle of an engine of the vehicle 1 in the fully-closed state. In addition, the control state determining section 17 monitors whether the brake is changed from ON to OFF. If it is determined that the brake is changed from ON to OFF by detecting a falling point (i.e., a changing point) in an output signal from the brake switch 29, then the control state determining section 17 cancels the command for holding the degree of opening of the throttle in the fully-closed state. At this time, control of the degree of opening of the throttle is started following the follow-running control, and the vehicle 1 runs appropriately following the preceding vehicle.

On the other hand, when the brake is changed from OFF to ON, the control state determining section 17 terminates the follow-running control if a rising point (i.e., a changing point) in the output signal form the brake switch 29 is detected.

Therefore, the same as in the first embodiment, only when the driver's intention for requesting the follow-running control is confirmed, the follow-running control is continued after the driver's braking operation. Thus, the vehicle 1 can appropriately advance such that the vehicle 1 follows the preceding vehicle. When the driver terminates the follow-running control with respect to the preceding vehicle by operating the brake, the follow-running control which is started while maintaining the braking operation by the driver, can be maintained so as not to be terminated.

Accordingly, the same as in the first embodiment, the driver does not need to cancel the braking operation when he or she inputs (i.e., sets) an operation for requesting the follow-running control. Thus, the driver can obtain his or her desired motion of the present vehicle. Therefore, it is possible to realize a follow-running control system for smoothly controlling the follow-running in consideration of the driver's operation performed according to changes in traffic situations around the present vehicle.

Moreover, in the termination control explained in the above-mentioned first and second embodiments, it can be set such that the follow-running control is terminated when the pressure of brake fluid (i.e., oil pressure) exceeds the target fluid pressure of the brake fluid (i.e., target oil pressure) which is determined by the brake fluid pressure determining section 15. By this setting, unwilled termination of the follow-running control can be avoided when the driver's foot softly touched the brake pedal by accident while the brake control section 14 is controlling the brake. In this case, the conditions in step S11 in the termination control will be changed to "Has the brake been changed from OFF to ON? and has the pressure of brake fluid exceeded the target fluid pressure of the brake fluid by increasing the degree of depressing the brake pedal?".

In the above-mentioned first and second embodiments, the changing point in the output signal from the brake switch 29 is termed as "falling point" when the brake is changed from ON to OFF, while the another changing point is termed as "rising point" when the brake is changed from OFF to ON. However, the combination of the state of the brake and the output signal from the brake switch 29 may be changed. For example, a changing point in the output signal from the brake switch 29 may be "a rising point" when the brake is changed from ON to OFF, while the another changing point may be "a falling point" when the brake is changed from OFF to ON.

While preferred embodiments of the invention have been described and illustrated above, it should be understood that they are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A running control system comprising:
   a vehicle speed measuring device for measuring a running speed of a present vehicle;
   an object detecting device, provided in the present vehicle, for detecting objects in an advance direction of the present vehicle;
   a preceding vehicle determining device for determining a preceding vehicle to be followed by the present vehicle from among the detected objects;
   a target inter-vehicle distance determining device for determining a target inter-vehicle distance between the present vehicle and the preceding vehicle;
   a target speed determining device for determining a target speed of the present vehicle based on a signal from the object detecting device and the target inter-vehicle distance;
   a follow-running control device for controlling follow-running of the present vehicle with respect to the preceding vehicle based on the determined target speed and the running speed of the present vehicle;
   a braking operation detection device for detecting a braking operation performed by a driver of the present vehicle;
   a follow-up intention detection device for detecting an operation of requesting a follow-running control by the driver; and
   a running control device for aborting the follow-running control with respect to the preceding vehicle based on an output signal from the braking operation detection device,
   wherein if an operation by the driver for requesting the follow-running control is detected while the braking operation by the driver is detected by the braking operation detection device, the running control device starts the follow-running control after the end of the driver's braking operation.

2. The running control system according to claim 1, wherein
   the braking operation detection device outputs an output signal in response to the braking operation by the driver, and
   the running control device terminates the follow-running control with respect to the preceding vehicle in response to a changing point in the output signal from the braking operation detecting device, which indicates a beginning of the braking operation by the driver.

3. A running control system comprising:
   a vehicle speed measuring device for measuring a running speed of a present vehicle;
   an object detecting device, provided in the present vehicle, for detecting objects in an advance direction of the present vehicle;

a preceding vehicle determining device for determining a preceding vehicle to be followed by the present vehicle from among the detected objects;

a target inter-vehicle distance determining device for determining a target inter-vehicle distance between the present vehicle and the preceding vehicle;

a target speed determining device for determining a target speed of the present vehicle based on a signal from the object detecting device and the target inter-vehicle distance;

a follow-running control device for controlling follow-running of the present vehicle with respect to the preceding vehicle based on the determined target speed and the running speed of the present vehicle;

a braking operation detection device for detecting a braking operation performed by a driver of the present vehicle;

a follow-up intention detection device for detecting an operation of requesting the follow-running control by the driver;

a running control device for aborting the follow-running control with respect to the preceding vehicle based on an output signal from the braking operation detection device; and a throttle opening control device for controlling a degree of opening of a throttle of the present vehicle based on control by the running control device; wherein if the operation for requesting the follow-running control is input by the driver while the braking operation by the driver is detected by the braking operation detection device, the running control device starts the follow-running control, and the throttle opening control device maintains the degree of opening of the throttle in a fully-closed state while detecting the driver's braking operation.

4. The running control system according to claim 3, wherein the braking operation detection device outputs the output signal in response to the braking operation by the driver, and the running control device terminates the follow-running control with respect to the preceding vehicle in response to a changing point in the output signal from the braking operation detecting device, which indicates a beginning of the braking operation by the driver.

* * * * *